(12) United States Patent
Hopf et al.

(10) Patent No.: US 7,876,588 B2
(45) Date of Patent: Jan. 25, 2011

(54) DEVICE FOR CONTROLLING AN ELECTROMECHANICAL POWER CONVERTER, PARTICULARLY OF AN ELECTRIC MOTOR

(75) Inventors: Steffen Hopf, Regensburg (DE); Manfred Ringlstetter, Weng (DE)

(73) Assignee: Continental Automotive GmbH, Hannover (DE)

( * ) Notice: Subject to any disclaimer, the term of this patent is extended or adjusted under 35 U.S.C. 154(b) by 631 days.

(21) Appl. No.: 11/910,479

(22) PCT Filed: Jan. 26, 2006

(86) PCT No.: PCT/EP2006/050479

§ 371 (c)(1),
(2), (4) Date: Oct. 2, 2007

(87) PCT Pub. No.: WO2006/106003

PCT Pub. Date: Oct. 12, 2006

(65) Prior Publication Data

US 2008/0158923 A1      Jul. 3, 2008

(30) Foreign Application Priority Data

Apr. 8, 2005 (DE) .................. 10 2005 016 278

(51) Int. Cl.
  *H02M 1/20* (2006.01)
(52) U.S. Cl. ......................................... 363/102
(58) Field of Classification Search ............ 363/102, 363/56.01, 56.02; 318/293; 361/143, 189
See application file for complete search history.

(56) References Cited

U.S. PATENT DOCUMENTS

| | | | | |
|---|---|---|---|---|
| 3,809,981 A | | 5/1974 | Maida | 318/294 |
| 5,220,492 A | * | 6/1993 | Rubin et al. | 363/97 |
| 6,061,253 A | * | 5/2000 | Igarashi et al. | 363/19 |
| 6,294,947 B1 | * | 9/2001 | Gabara | 327/403 |
| 6,486,625 B1 | * | 11/2002 | Vilou | 318/139 |
| 6,487,062 B1 | * | 11/2002 | Kristiansen | 361/189 |
| 6,914,202 B2 | * | 7/2005 | Sugimoto et al. | 200/1 B |
| 7,002,309 B2 | * | 2/2006 | Ohshima | 318/286 |
| 7,141,944 B2 | * | 11/2006 | Svobodnik | 318/400.29 |

FOREIGN PATENT DOCUMENTS

| | | |
|---|---|---|
| DE | 3516985 | 5/1985 |
| DE | 3830555 | 9/1988 |
| DE | 19811151 | 3/1998 |
| DE | 19921344 | 5/1999 |
| EP | 0978401 | 7/1999 |

OTHER PUBLICATIONS

International Search Report and Written Opinion of PCT/EP2006/050479, 14 pages, May 12, 2006.

* cited by examiner

*Primary Examiner*—Adolf Berhane
*Assistant Examiner*—Emily Pham
(74) *Attorney, Agent, or Firm*—King & Spalding L.L.P.

(57) ABSTRACT

In a device and a method for controlling an electromechanical power converter (10), particularly of an electric motor and/or generator, comparatively cost-effective switches (14, 18) can be used without drastically decreasing the serviceable life of the entire system. A number of controllable switches (14, 18) can be used for controlling the converter (10), and dividing up a switching load, which is caused when connecting e.g. short-circuiting converter connections (21, 22), to a number of switches (14, 18) over the serviceable life.

18 Claims, 2 Drawing Sheets

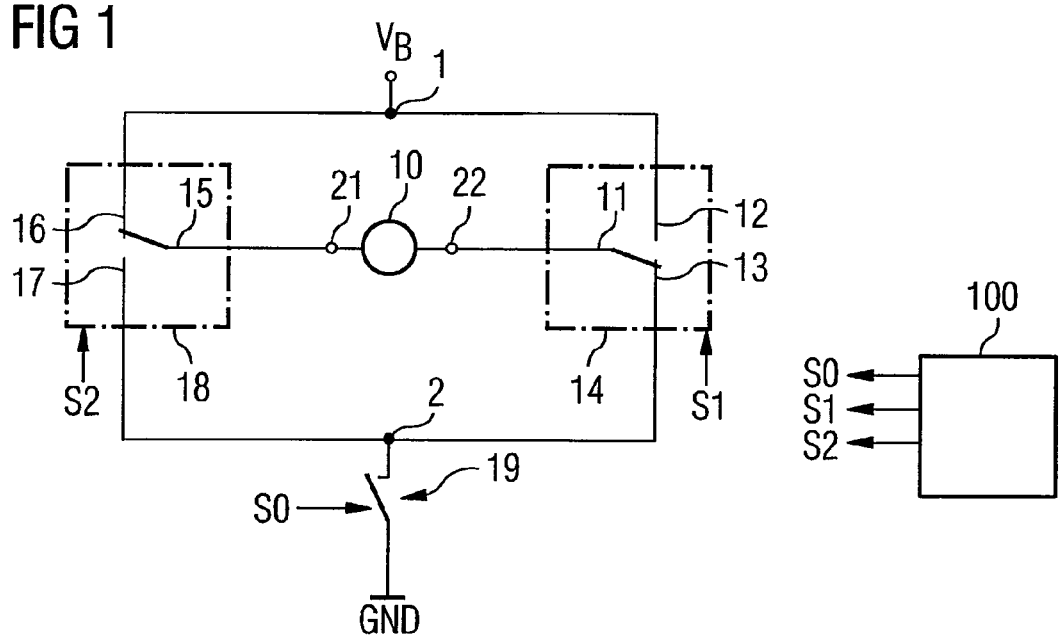
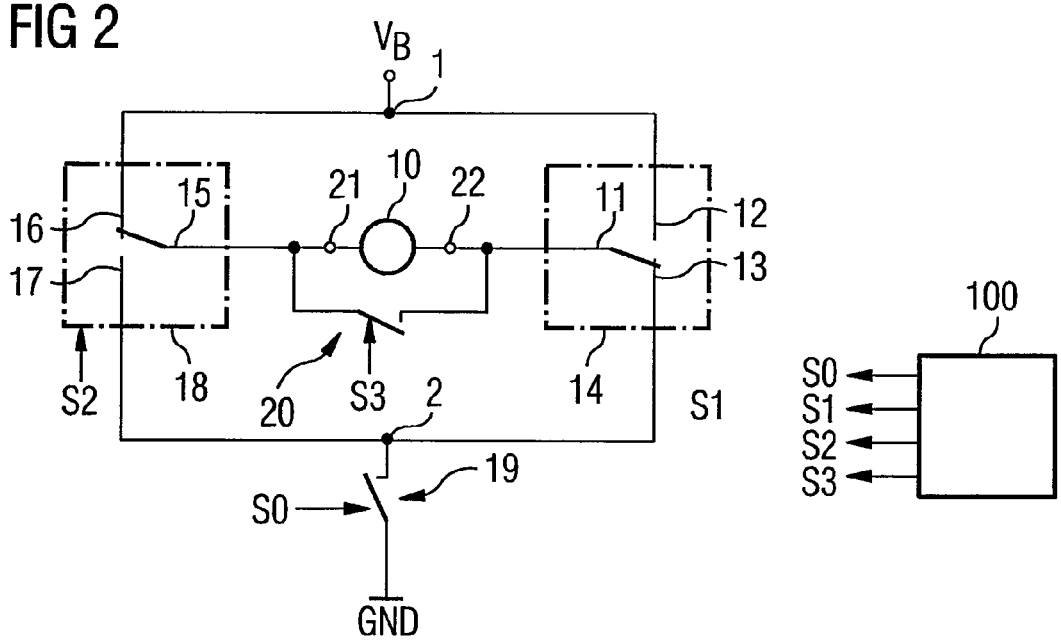

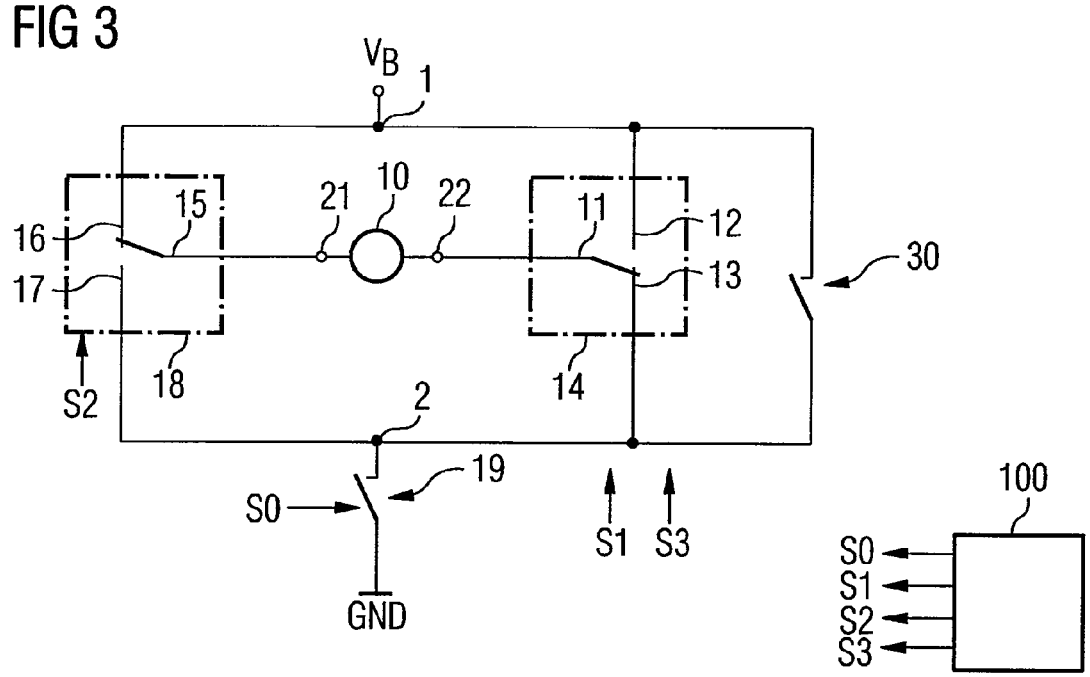

DEVICE FOR CONTROLLING AN ELECTROMECHANICAL POWER CONVERTER, PARTICULARLY OF AN ELECTRIC MOTOR

CROSS-REFERENCE TO RELATED APPLICATIONS

This application is a U.S. national stage application of International Application No. PCT/EP2006/050479 filed Jan. 26, 2006, which designates the United States of America, and claims priority to German application number 10 2005 016 278.9 filed Apr. 8, 2005, the contents of which are hereby incorporated by reference in their entirety.

TECHNICAL FIELD

The present invention relates to a device for controlling an electromechanical power converter, especially an electric motor. The invention further relates to a method for controlling such a converter.

BACKGROUND

Control devices for controlling an electrical direct current motor are known in which the motor is driven by applying an operating voltage supplied by the control device to the connection terminals of the motor (drive mode). By applying the operating voltage in alternating polarity the direction of rotation (right, left) of the motor can be determined or reversed. The speed of the motor can be varied in an open-loop control or closed-loop control system by a corresponding variation of the operating voltage or of the operating current applied. To bring the motor to a stop again it is often sufficient simply to cut the power to the motor since the motor is then braked under the force of friction.

However, if the motor is to be brought to a stop more quickly or "actively braked" this can be achieved by the connection terminals of the motor being short circuited (braking mode).

To initiate the braking mode or the short circuit, with known control devices a switch is closed (switched on), which short-circuits the connection terminals of the motor over a short-circuit path containing the switch.

An attempted or actual motor rotation caused by a load coupled mechanically to the motor can also be braked or restricted by such as short circuit.

The short circuit can also be removed after the motor comes to a stop and the polarity of the operating voltage at the connection terminals reversed, so that the motor starts up again in the opposite direction.

Such motors are typically used in automotive technology, in systems engineering and in household appliance technology. In practice the modes (drive mode, braking mode) or the directions of movement or rotation (to the right, to the left) generally change very often, viewed over the service life of the system.

Switches used for applying the operating voltage or for producing short circuits, e.g. pairs of relay switch contacts, are in many cases subjected to a significant (cumulative) switching load considered over the service life of the motor. During short circuiting in particular a heavy short-term load is imposed on the switches used for this purpose, if this switch is "hard switched", i.e. an induction voltage is switched on under the load and then a comparatively large short circuit current flows over the switch. This is a problem to the extent that the switching contacts are subjected to significant wear by these loads.

This problem has already been resolved in the past for mechanical switches (e.g. relays) by using switching contacts which were designed to safely withstand the number of short-circuit switching processes expected over the service life of the motor. Such switches however are relatively expensive and need a relatively large amount of space. Another solution, but a relatively expensive one however, would be to use very powerful semiconductor switches.

SUMMARY

According to an embodiment, a device as well as a method for controlling an electromechanical power converter, especially an electric motor and/or generator, in which comparatively low-cost switches can be used without thereby drastically reducing the service life of the overall system can be provided by a control device for an electromechanical power converter with two converter terminals, between which in a first operating mode an operating voltage is applied and which in a second operating mode are connected together, wherein the control device comprising: an operating voltage source for providing the operating voltage between a first supply connection and a second supply connection, controllable switches, by means of which the converter terminals are switched to the first supply connection and to the second supply connection, respectively, and a control unit for controlling the switches, wherein the control unit is configured such that a switching load generated by the initiation of the second operating mode of the switches is at least approximately evenly distributed to the switches.

According to a further embodiment, the control unit can be configured so that the switches are switched on with the same frequency for initiation of the second operating mode. According to a further embodiment, the control device may have a memory device for storing the accumulated switching load of the switches and/or other information, with the control unit selecting if required on the basis of the stored information a switch to be switched on for initiating the second operating mode. According to a further embodiment, the control unit can be configured such that the switches used for initiating the second operating mode are determined statistically. According to a further embodiment, at least one of the switches can be embodied as a mechanical switch. According to a further embodiment, a number of the switches can be combined into one constructional unit. According to a further embodiment, the control device may have a further controllable switch operable to couple the converter terminals together. According to a further embodiment, the control unit can be configured so that the further switch is also included in the at least approximately even distribution of the switching load generated by the initiation of the second operating mode. According to a further embodiment, the further switch can be embodied separately from the first-mentioned switches.

According to another embodiment, a method for controlling an electromechanical power converter with two converter terminals, between which in a first operating mode an operating voltage is to be applied and which are to be connected together in a second operating mode, may comprise the following steps: Providing the operating voltage between a first supply connection and a second supply connection, Switching the converter terminals to the first supply connection or to the second supply connection respectively by means of controllable switches and Controlling the switches such that a switching load of the switches generated by initiation of the second operating mode is distributed approximately evenly between the switches.

According to yet another embodiment, the method may further comprise the step of connecting together the converter terminals by means of a further controllable switch, and Controlling the further switch.

BRIEF DESCRIPTION OF THE DRAWINGS

The invention is explained in more detail below on the basis of a number of exemplary embodiments with reference to the enclosed drawings. The Figures show:

FIG. 1 shows the layout of a device according to the an embodiment,

FIG. 2 shows the layout of a device according to a further embodiment, and

FIG. 3 shows a further embodiment of a device.

DETAILED DESCRIPTION

According to various embodiment, a plurality of controllable switches is used to control the electromechanical power converter and to distribute a switching load imposed during the connection, e.g. short circuiting of converter terminals between a number of switches, viewed over the service life of the converter.

The control device may preferably be embodied separately from the converter and simply connected to the converter via the converter terminals.

In one embodiment, the electromechanical power converter can be a direct current motor. The invention is, however, in no way restricted to this but can also for example be used for an electrical generator or a motor-generator combination. For example the device involved can be a converter arranged in the drive train of a motor vehicle, which can act as a drive (especially an auxiliary drive in a hybrid vehicle) and/or braking device and/or generator (e.g. for energy recovery in a hybrid vehicle).

A preferred use of the control device or the control process can be the control of a direct current motor which operates as an actuator in a parking brake of a motor vehicle. Such very easy-to-use electromechanical brakes, operating to some extent at the push of a button, are increasingly replacing the conventional still manually-operated "handbrakes". With these modern brakes for which the actuation force (usually via a gear) is in the final analysis provided by an electromechanical converter, there is a particular desire for the setting of the braking mechanics to be defined as precisely as possible. In these braking systems the electric motor should thus be able to be braked as efficiently or as quickly as possible, so as for example, when the brake is released, not to move the braking mechanics unnecessarily far through the inertia of the motor and/or of the gear. This would for example unnecessarily lengthen the time needed before the next activation of the brake.

The use according to various embodiments for electromechanical brakes (e.g. the parking brakes referred to) is also of interest to the extent that such braking systems can be embodied with an anti-blocking function which is required for a multiple or very frequent and rapid succession of activations and deactivations of the brake during a single braking process. The concomitant comparatively large switching load on switches in the activation circuit used can be better handled according to various embodiments in respect of extending the service life of said switches.

According to an embodiment, the switches used to apply the operating voltage with optional polarity are also used to connect together the two converter terminals, with the switching load generated during the connection observed over a longer period being at least approximately evenly distributed between these switches. These switching processes do not thus impose a constant load on one and the same switch or one and the same switch section of the plurality of switches.

This means that it is possible in a simple manner to balance out the respective switching load between the individual switches, so that the overall service life of the switch arrangement is increased. In many applications it is thus possible to use switches which are designed for comparatively low-power switching and/or comparatively few switching processes. Here is an example: If two switches or switch contacts were always used for connecting together the converter terminals, referred to below as "initiating the second operating mode" and if the same switches/switch contacts were always actually to be used, then with the inventive measure a same frequency of use for both switches/switch contacts, can be typically provided, so that the load on each of the two switches/switch contacts on average over time corresponds to only around half the load on a single switch/switch contact.

The "at least approximately even distribution" mentioned in the claims is intended to mean that, viewed over a longer period or averaged over time (e.g. considered over the entire service life) a cumulative switching load (e.g. number of switch-on operations) of the individual switches occurs which is of the same order of magnitude.

The "connection to each other" is not absolutely necessarily short circuiting. One more or less low-resistance connection of the converter terminals already comes into consideration in many applications. For example the "connection current" can be routed via at least one resistive component. By providing such a resistance which can also be provided to allow its variation to be controlled, the intended effect in the second operating mode (e.g. braking effect for a motor) can be varied and/or the loading of the switches reduced even further. All known types of variable resistor can be used for this purpose.

By distributing the switching load, switches the tendency is for lower-cost and, when mechanical switches are used, switches occupying less space, to be able to be used.

The switches used for initiating the second operating mode can for example be loaded using a software-algorithm running in a control unit in a predetermined alternating manner, especially in order to achieve approximately the same loading over the service life of the motor.

According to an embodiment, the switches are switched on with the same frequency for initiation of the second operating mode in order to distribute the switching load evenly.

If the second operating mode is to be initiated at a specific point in time and if different switches are to be able to be used for this, then for example those switches can be selected and actually used which have the lowest accumulated switching loads (e.g. determined from a "switching history").

The "accumulated switching load" can for example be viewed in a very simple way as the total number of previous switch-on processes for connecting the converter terminals together. This number can vary for the individual switches provided the sum of the loads of the individual switches is approximately the same. In this case there can also be provision for the same switches or switch contacts to be used a number of times in succession for initiating the second operating mode and another switch or switch contact subsequently to be used likewise a number of times in succession for initiation. As an alternative two or more usable switches can be used alternately or in a cycle.

The fact that during the determination of the cumulative switching load the "load extent" of the individual switch-on processes is also taken into consideration should not be ignored. This can be especially of advantage in applications in which for example the speed of rotation of the converter can be vary immediately before initiation of the second operating mode. In this case initiations of the second operating system (e.g. for active breaking of a direct current motor) at high rotational speed are given a greater weight in the determination of the cumulative switching load than initiations at lower rotational speed.

In one embodiment a memory device is provided for storing the cumulative switching load of each switch and/or other information, with the control unit if necessary selecting on the basis of the stored information a switch or switch contact to be switched on for initiation of the second operating mode.

The memory device can for example be implemented by a read-write memory such as an EEPROM, a RAM or a hard disk.

The selection of the switch to be switched on for initiation of the second operating mode can be simplified with a memory device. If for example the cumulative switching load of these switches is stored an update of this information after each corresponding switching process is sufficient. As an alternative or in addition information about the switch to be used for the next initiation can be stored.

The distribution of the switching load provided for by the invention is realized in one embodiment by an electronic control unit, which can be programmable for example (e.g. PLC, microcontroller or PC). This control unit can also control other operating modes, especially one or more drive modes. Even if the switching sequence can be hard-wired, especially when the above-mentioned memory device is used, operation of the control by (if possible modifiable) software is to be preferred.

There is provision in one embodiment for the switch to be used for initiation of the second operating mode to be determined statistically. To this end for example one of a number of switches able to be used for initiation of the second operating mode can be as randomly as possible (e.g. by a random generator). The switching load of the switches viewed over the entire service life can also be essentially evenly distributed by this arrangement which is generally easy to implement.

According to an embodiment, at least one of the switches is embodied as a mechanical switch, especially a relay switch contact pair. This allows especially high switch loads to be handled at comparatively low cost. If the switching load is distributed to a number of relay switch contact pairs in accordance with the information, this advantageously increases the time until such a contact pair fails.

To further reduce the space required for installation it is of advantage for a number of the switches, especially all switches to be combined into one constructional unit. This reduction in the mounting space required is especially significant when mechanical switches are used. Furthermore a combination of the switches reduces the effort in manufacturing the control device.

The combination of switches can for example be provided in such a way that a first switch for connecting a first converter terminal to the first power supply connection is combined as a "load transfer switch" with a second switch for connecting the first converter terminal to the second power supply connection. In a similar manner a second switch of the unit can also be formed by combining a third switch for connecting it the second converter terminal to the first power supply connection with a fourth switch for connecting the second converter terminal with the second power supply connection. These four switches can thus for example be implemented by two load transfer relays. The two load transfer units can be further combined, e.g. into a double load transfer relay or similar.

As well as the quite general advantages already mentioned of a mechanical combination of switches, this combination also has a further significant advantage. For a defect of just one individual switch in such a unit it is generally sensible in practice, if not entirely necessary, to replace the entire unit (e.g. a multiple relay or an IC final stage). If however in accordance with an embodiment the switching load is distributed at least approximately evenly between the switches contained in the unit, this means that the ability of the entire unit to withstand loads is exploited in more or less the optimum way.

According to an embodiment, a number of controllable switches are used to apply the operating voltage to the converter terminals, with a further (additional) controllable switch being provided through which the converter terminals can be connected to one another With this additional switch, the switching load generated on initiation of the second operating mode can advantageously be entirely or partly "handled by the first switches or switch contacts". This also allows the service life of the overall system to be increased even if comparatively low-cost switches are used.

According to various embodiments, considered over longer periods of time, both the first-mentioned switches and also the further switches can be used to initiate the second operating mode. In particular the further switches can be included in the at least approximately even distribution of the switching load. This makes it possible to reduce the loading of the individual switches even further, enabling the individual switches to be embodied as even more compact and/or low-cost designs.

In one embodiment there is provision for the further switch to be embodied separately from the first-mentioned switches. This enables the proposed device to be adapted to a plurality of applications. It is also advantageously possible to implement the first-mentioned switches at low cost through one or more relays and to implement the further switches used for example as heavily loaded short circuit switches as more expensive (loadable) switches (e.g. as power semiconductors).

The further switches do not absolutely have to be arranged to connect the two converter terminals directly, but this connection can alternatively also be implemented by also using the first-mentioned switches.

It is however also possible for example to provide the further switches as a further contact pair of a relay present in any event for implementing the first mentioned switches.

FIG. 1 shows an electric motor labeled 10 which is connected to load transfer switches 14 and 18. The load transfer switches 14 and 18 each contain a common contact 11, 15, a first make contact 12, 16 and a second make contact 13, 17. The load transfer switches 14, 18 are combined into a single relay which is controlled by two control signals S1 and S2. The common contacts 11, 15 are connected to connection terminals 21, 22 of the motor 10. The first make contacts 12, 16 are connected to a first power supply connection 1 (here: positive operating voltage VB). The second make contacts 13, 17 are connected to a second power supply connection 2, which is able to be connected in its turn via a main switch 19 to electrical ground GND. The main switch 19 is also implemented as a relay contact pair in a relay which is controlled by a control signal S0. Such a main switch could alternatively also be realized as an electronic switch (e.g. a MOSFET). FIG. 1 also shows a control unit 100, which outputs the control signals S0, S1 and S2 for controlling the load transfer switches 14, 18 as well as the main switch 19.

To drive the motor 10 (first operating mode), the main switch 19 must be closed. This is done by the control signal S0 of the control unit 100. The direction of rotation of the motor 10 is determined via the setting of the load transfer switches 14 and 18. If the circuit of the operating voltage VB via first make contact 16, common contact 15, motor terminal 21, motor 10, motor terminal 22, common contact 11, second make contact 13 and main switch 19 to ground GND is closed, the motor 10 turns in a particular direction, e.g. to the right. If on the other hand the circuit of operating voltage VB via first make contact 12, common contact 11, motor terminal 22, motor 10, motor terminal 21, common contact 15, second make contact 17 and main switch 19 to ground GND is closed, the motor 10 turns in the opposite direction.

If the motor 10 is to be braked, the main switch 19 can be opened for this purpose. For "active braking" (second operating mode), such as to bring the motor to a stop in a shorter time, there are two possibilities in the example shown:

a) The common contacts 11, 15 of the load transfer switches 14, 18 are each connected to the first make contacts 12, 16, i.e. both motor terminals 21, 22 are connected to the first power supply connection 1. This is also referred to below as "high side brake".

b) The common contacts 11, 15 of the load transfer switches 14, 18 are each connected to the second make contacts 13, 17, i.e. both motor terminals 21, 22 are connected to the second power supply connection 2. This is also referred to below as "low side brake".

In the case of "high side brake" the power circuit appears as follows: Operating voltage VB, first make contact 12, common contact 11, motor terminal 22, motor 10, motor terminal 21, common contact 15, first make contact 16, operating voltage VB.

In the case of "low side brake" the power circuit appears as follows: Ground GND, second make contact 13, common contact 11, motor terminal 22, motor 10, motor terminal 21, common contact 15, second make contact 17, ground GND.

The motor 10 will be short circuited by each of these two possible circuits which, because of the motor's inherent induction, soon brings it to a halt. The active braking process can also be executed with a closed main switch 19.

The main switch 19 provided in this exemplary embodiment in the ground path for interruption or feeding of the operating voltage to the power supply terminals 1, 2 could be arranged as an alternative or in addition on the "high side" too, i.e. interrupting the operating voltage VB.

The control unit 100 controls the motor operation, especially the individual switching processes, by output of the control signals S0, S1 and S2. The main switch 19 can be switched on and off by the control signal S0. The common contact 11 of the load transfer switch 14 can optionally be switched from the first make contact 12 to the second make contact 13 or vice versa by the control signal S1. The control signal S2 switches the common contact 15 of the load transfer switch 18 from the first make contact 16 to the second make contact 17 and vice versa.

Table 1 shows the signal states of the control unit 100 for different operating modes. In this table "0", means that the main switch 19 is open that the common contact of the relevant load transfer switch 14 or 18 is connected to the second make contact; "1", that the main switch 19 is closed or that the common contact of the load transfer switch 14 or 18 is connected to the first make contact, and "X" that the state of the switch is not relevant.

TABLE 1

| Mode | S0: | S1: | S2: |
| --- | --- | --- | --- |
| Running to the left | 1 | 1 | 0 |
| Running to the right | 1 | 0 | 1 |
| Slowing down | 0 | X | X |
| "high side brake" | X | 1 | 1 |
| "low side brake" | X | 0 | 0 |

The control of the switching processes or the output of the switching signals S1 and S2, after which the motor is braked via "high side brake" or "low side brake", is undertaken in a programmable manner according to an algorithm defined beforehand, through which the loading of the switching contacts 11, 12, 13 and 15, 16, 17 is undertaken in a largely balanced manner. This algorithm is either executed by the control unit 100 or by a supplementary device (not shown) which is connected to control unit 100.

There are numerous options for the actual implementation of the algorithm. With the embodiment shown in FIG. 1 for example there is provision for the braking processes to be put into effect for braking the motor 10 n consecutive times by "high side brake" and then n consecutive times by the "low side brake", with n being a small whole number. In the simplest case n=1 is selected so that the initiation of the braking mode is undertaken alternately by "high side brake" and "low side brake".

With this type of alternating short circuit it is sufficient to store information in the area of the control device (hard-wired logic and/or by means of software) as to the type of short circuit which was last used (or which is to be selected as the next). The result is an evening out of the switching load compared to a case in which the same types of short-circuit are always used to short-circuit the motor.

A further improvement is produced if not only "high side brake" and "low side brake" are used for braking with roughly the same frequency but each of these two short circuit types in its turn is initiated approximately with the same frequency by means of the two load transfer switches able to be used for this purpose 14, 18. For the latter choice the two load transfer switches 14, 18 may have to be simultaneously switched over and then the selected load transfer switch 14 or 18 switched back again.

To distribute the switching load even more evenly to the load transfers switches 14, 18 or to the individual switches 11, 12; 11, 13; 15, 16; 15, 17 formed from a variable which is representative of the subsequent short circuit switching can also be measured before each braking mode initiation, in order to be taken into account for a determination and storage or updating of the cumulative switching load. A variable which might be considered here is for example the speed of the motor, the amount of the operating voltage or the extent of the load coupled to the motor.

In the situation shown in FIG. 1 the motor 10 will not be driven. There are two options for initiating a drive mode corresponding to the position of the double load transfer switch 14, 18 shown in FIG. 1: One option consists of closing the main switch 19. The other option consists of first switching over one of the load transfer switches 14, 18, then switching on the main switch 19, and finally switching the load transfer switches 14 or 18 back again. In the first case only the main switch is significantly loaded during the initiation of the drive mode whereas in the second case only the corresponding load transfer switch 14 or 18 is significantly loaded (high inrush current). This loading generated by initiation of the drive mode is as a rule smaller than the load generated on connection of the motor terminals at 21, 22, but could also be taken into account for the desired distribution of the switching load generated by initiation of the second operating mode. Thus for the selection of the switch to be used for a short circuit the cumulative switching load of the individual switches and also their drive initiations could be taken into consideration and/or conversely even the selection of the initiation type for the drive mode explained above could also be undertaken on the basis of a stored or updated cumulative switching load (or statistically).

In the subsequent description of further exemplary embodiments the same reference figures are used for components which have the same effect. In these cases essentially only the differences from the embodiment or embodiments already described are discussed and otherwise explicit reference is made to the description of previous exemplary embodiments.

FIG. 2 shows a further embodiment of a control device 10 for controlling a motor 10.

In this embodiment an additional switch 20 is provided which is connected in parallel to the motor 10 or to the motor terminals 21, 22. Thus it is possible with the aid of the switch 20 to short circuit the motor 10 regardless of the switch position of the load transfer switches 14, 18.

The control unit 100 in this case controls the individual switching processes again using control signals S0, S1, S2 and S3. The control signal S3 switches the additional switch 20 from the open state into the closed state and vice-versa. The main switch 19 must be opened when the further switch 20 for shirt circuiting the motor 10 is closed. This means that a corresponding dependency exists between the signals S0 and S3.

In Table 2 the possible signal states of the control unit 100 from FIG. 2 are specified. In this table "0", "1" and "X" have the same meaning as in Table 1.

TABLE 2

| Mode | S0: | S1: | S2: | S3: |
|---|---|---|---|---|
| "high side brake" | 0 | 1 | 1 | 0 |
| "low side brake" | 0 | 0 | 0 | 0 |
| Short circuit | 0 | X | X | 1 |

By using the additional switch 20 to short circuit the motor terminals 21, 22 the switching loads of the load transfer switches 14, 18 can be reduced. The resulting extension of the service life of the overall system can in this case be combined with the special feature described with reference to FIG. 1 that the switching load generated on initiation of the breaking mode is at least partly also allocated to the load transfer switches 14, 18. The latter measure is for example above all of interest if the additional switch 20 is also formed together with the load transfer switches 14, 18 in a single relay.

FIG. 3 shows a modification of the embodiment shown in FIG. 2.

Here too an additional switch 30 is provided by means of which the motor 10 can be short-circuited.

The switch 30 is however (unlike the switch 20 of FIG. 2) arranged for connecting the power supply terminals 1, 2 together. Despite this it is possible to short circuit the motor with the aid of switch 30. Before switch 30 is switched on to initiate the short circuit the main switch must be open or opened. In addition the two load transfers switches 14, 18 must be brought for this purpose into one of two possible switch position combinations, namely the switch position combinations shown in FIG. 3 or an opposite combination in which both the load transfer switch 14 and also the load transfer switch 18 are each switched over.

In Table 3 the possible signal states of S0, S1, S2 and S3 in FIG. 3 are specified. In this case "0", "1" and "X" have the same meaning as in Tables 1 and 2

TABLE 3

| Mode | S0: | S1: | S2: | S3: |
|---|---|---|---|---|
| "high side brake" | 0 | 1 | 1 | 0 |
| "low side brake" | 0 | 0 | 0 | 0 |
| Short circuit I | 0 | 1 | 0 | 1 |
| Short circuit II | 0 | 0 | 1 | 1 |

With the exemplary embodiments described above the option is provided for a direct current motor of both driving the motor in different directions and also of braking it. Viewed over the service life, the load transfer switches used in this case and/or the individual switch contacts have approximately the same load imposed on them, which increases their service life and reliability.

An especially advantageous use is produced in automotive technology, e.g. for an electromechanical power converter arranged in the drive train of a motor vehicle (e.g. electric motor/generator).

What is claimed is:

1. A control device for an electromechanical power converter with two converter terminals, between which in a first operating mode an operating voltage is applied and which in a second operating mode are connected together, the control device comprising:

an operating voltage source for providing the operating voltage between a first supply connection and a second supply connection, controllable switches, by means of which the converter terminals are switched to the first supply connection and to the second supply connection, respectively, a control unit for controlling the switches, wherein the control unit is configured such that a switching load generated by the initiation of the second operating mode of the switches is at least approximately evenly distributed to the switches, and a memory device for storing information including the accumulated switching load of the switches and/or other information, wherein the control unit is further configured to select, if necessary, and based on the stored information, a switch to be switched on for initiating the second operating mode.

2. The control device according to claim 1, wherein the control unit is configured so that the switches are switched on with the same frequency for initiation of the second operating mode.

3. The control device according to claim 1, wherein the control unit is configured such that the switches used for initiating the second operating mode are determined statistically.

4. The control device according to claim 1, wherein at least one of the switches is embodied as a mechanical switch.

5. The control device according to claim 1, wherein a number of the switches is combined into one constructional unit.

6. A control device according to claim 1, comprising a further controllable switch operable to couple the converter terminals together.

7. The control device according to claim 6, wherein the control unit is configured so that the further switch are also included in the at least approximately even distribution of the switching load generated by the initiation of the second operating mode.

8. The control device according to claim 6, wherein the further switch being embodied separately from the first-mentioned switches.

9. A method for controlling an electromechanical power converter with two converter terminals, between which in a first operating mode an operating voltage is to be applied and which are to be connected together in a second operating mode, comprising the following steps:
providing the operating voltage between a first supply connection and a second supply connection,
switching the converter terminals to the first supply connection or to the second supply connection respectively by means of controllable switches,
controlling the switches such that a switching load of the switches generated by initiation of the second operating mode is distributed approximately evenly between the switches,
storing information including the accumulated switching load of the switches and/or other information, and
if required, selecting on the basis of the stored information a switch to be switched on for initiating the second operating mode.

10. The method according to claim 9,
further comprising the step of connecting together the converter terminals by means of a further controllable switch, and
controlling the further switch.

11. The control device according to claim 1, wherein the electromechanical power converter is a electric motor and/or generator.

12. The control device according to claim 1, wherein at least one of the switches is embodied as a relay switch contact pair.

13. The method according to claim 9, wherein the switches are switched on with the same frequency for initiation of the second operating mode.

14. The method according to claim 9, further comprising the steps of determining the switches used for initiating the second operating mode statistically.

15. The method according to claim 9, wherein at least one of the switches is embodied as a mechanical switch.

16. The method according to claim 9, wherein at least one of the switches is embodied as a relay switch contact pair.

17. The method according to claim 9, further comprising the step of combining a number of the switches into one constructional unit.

18. The method according to claim 10, wherein the step of controlling the switches includes the further switch in the at least approximately even distribution of the switching load generated by the initiation of the second operating mode.

* * * * *